UNITED STATES PATENT OFFICE.

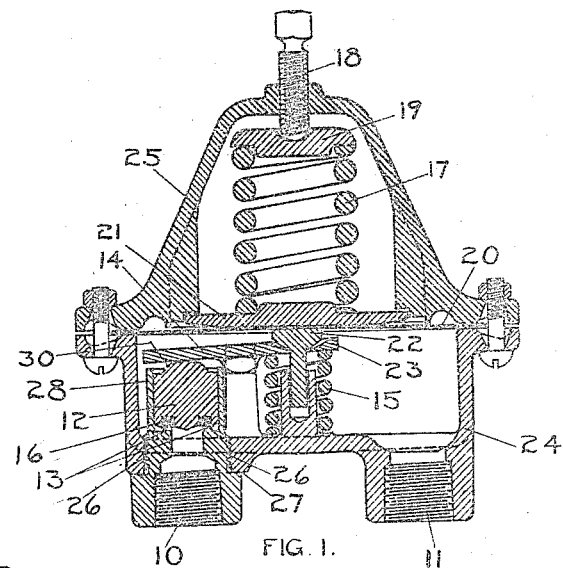
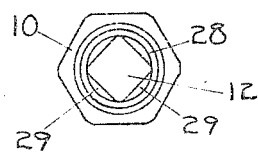
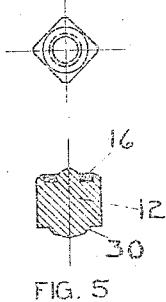
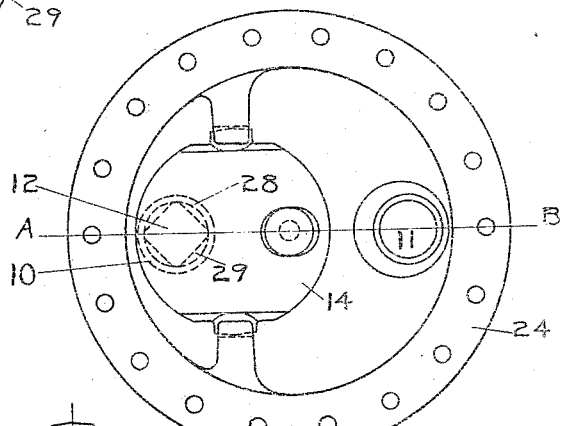
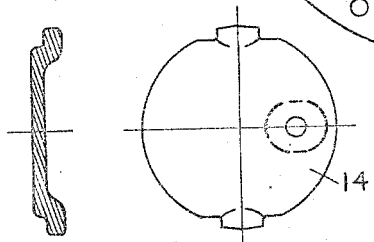

ARTHUR W. CASH AND ELMER F. LEMMON, OF DECATUR, ILLINOIS.

PRESSURE-REGULATING VALVE.

1,180,007. Specification of Letters Patent. Patented Apr. 18, 1916.

Application filed October 18, 1915. Serial No. 56,454.

*To all whom it may concern:*

Be it known that we, ARTHUR W. CASH and ELMER F. LEMMON, citizens of the United States, residing at Decatur, in the county of Macon and State of Illinois, have invented certain new and useful Improvements in Pressure-Regulating Valves, as set forth in the annexed specification and drawings.

Our invention relates to improvements, in that class of pressure regulating valves, commonly known as "diaphragm type", or "diaphragm operated", in which the reduced and regulated pressure is caused to act against a spring or a weight loaded diaphragm, the degree of adjustment, or weight acting against the opposite side of the diaphragm, predetermining the regulated delivery pressure in accordance with requirements.

In all pressure regulating valves for fluid service, whether of the diaphragm or distinctive piston operated type, the common fault, or weakness inherent resides in the valve seat and valve seat disk which soon becomes scored and worn due to both erosive and corrosive action of the various fluids being controlled by the valve, with the common result, that when all of the outlet flow has ceased, the valve seat and seat disk do not close tight enough to prevent more or less leakage which will quite generally allow the reduced, or regulated pressure to gradually increase until it is equal, or nearly equal to the initial or high pressure. This undesirable condition is further hastened and brought about by reason of small particles of foreign matter in the pipes or conduits which convey the fluids or liquids, such as grit, sand, scale, metal cuttings, filings, and rust, mineral substances, etc., these foreign substances becoming stopped and lodged in the restricted opening between the valve seat and seat disk, which restricted opening is entirely essential to the proper operation of the valve in causing a reduction of pressure by means of a sufficient amount of friction brought about by a sufficiently high velocity of flow while the fluid is passing through the valve seat.

It being seen from the foregoing, that the valve seat and seat disk in all pressure reducing and regulating valves of whatever type or make soon become worn and unable to fully perform their required service; it follows, that it is very desirable to have a pressure regulating valve so constructed that the valve seat and seat disk may be quickly and inexpensively removed and replaced whenever they become fouled or obstructed by foreign matter, or worn to a degree where they will not close tight when the outlet fluid flow has been greatly diminished or entirely stopped.

To accomplish the last named object we have provided an improved form of valve seat, and valve seat disk as clearly set forth in the annexed specification and drawings, in which, Figure 1 is a sectional elevation through line A. B. of Fig. 2. Fig. 2, is a plan view of the lower chambered casing portion with the upper casing portion and diaphragm removed. Fig. 3, is a plan view of the inlet connection and guide way for the slidably mounted valve, with the valve inserted. Fig. 4, is a plan and sectional view showing detailed construction of the lever. Fig. 5 is a plan, and sectional elevation showing detail construction of the valve proper with the double, or reversible seat disks.

Similar reference numerals refer to corresponding parts throughout the several views.

In Fig. 1, the high or initial pressure connection is at 10, and the regulated outlet pressure connection is at 11, the slidably mounted valve 12, being shown in a closed position against the valve seat 13, pivoted lever 14, through the action of the compressed spring 15 holding the valve disk 16, tight against the seat 13. The position of the valve disk 16 in relation to the seat 13, as shown in Fig. 1, is the normal position before the loading spring 17 has been subjected to compression by the adjusting screw 18 through spring button 19, and is also the normal position after spring 17 has been compressed to the predetermined degree and the regulated fluid pressure has reached its maximum point, and caused the diaphragm 20, to be raised against the pressure plate 21 until the diaphragm is no longer in pressing contact with pusher post 22, in which position, spring 15 pressing against the under side of lever 14, has sufficient power to hold seat disk 16 tightly on seat 13 against the high, or initial pressure.

Loading spring 17, having been subjected to the required degree of compression, acting through pressure plate 21, forces diaphragm 20 downward, which in turn acting through pusher post 22, will force the end 23, of lever 14, downward, thereby permitting the high or initial pressure at 10 to open valve 12 and allow the initial pressure to flow past the valve seat 13 until the reduced or regulated pressure is again restored to its maximum point.

We are aware that diaphragm operated regulating valves having lever connection between the diaphragm and the valve proper and operating in a manner similar to that just described are old and well known, therefore we do not claim improvement in these members except in so far as the improvement in construction, and a new combination of members permit the use of our improved inlet connection and valve seat, and the improved valve proper together with the means for quickly and inexpensively removing and replacing the same.

In order to best withstand the corroding and eroding action of various fluids, the valve seat 13, is by common usage made of a higher grade material much more expensive than the material generally used in casing portions 24, and 25, therefore seat 13 and inlet connection 10 have been provided in a small and inexpensive form readily removed from casing 24, or renewed therein by means of the screw threaded portion 26 and the shoulder 27, the latter making a fluid tight joint.

We further provide inlet connection 10 with an integral guiding portion 28 above seat 13, this guiding portion being adapted to receive and guide a slidably mounted valve 12 which is preferably of a polygonal form, to permit of fluid passage through spaces 29, although the valve 12, may if preferred be made with a round body to closely fit the cylindrical guiding portion 28, in which case radial holes would be provided to permit the fluid flow through the cylindrical walls of guiding portion 28 on a plane level with, or just above the seat 13.

Valve 12 is shown with a seat disk 16, of some suitable soft material such as half hard rubber, or asbestos, while the opposite end provides a cone shaped seat 30 integral with the valve body, but if preferred, the valve may have both ends provided with a seat disk of soft yielding material, or both ends may be of the harder material as found most lasting or desirable for controlling the fluid being regulated.

It is obvious that the flow of such fluids as would have the erosive action on the valve as described, in flowing upward around the valve 12, and through the spaces 29, may impinge on diaphragm 20 and cause a rapid cutting or wearing away of same, and to prevent such wearing or cutting action, we have provided the lever 14 in a broad or wide form to effectively intercept the course of the fluid flow just above its outlet from the cylindrical guiding portion 28, and divert it in a manner to prevent its eroding action on diaphragm 20.

Having described the construction and operation of a valve embodying our improvements, we claim, 1. In a pressure regulating valve, the combination of an upper casing portion and lower chambered casing portion, said lower chambered casing portion providing pivot bearings for a pivoted lever, a diaphragm to imperviously separate said upper and lower casing portions, an abutting member between said diaphragm and said pivoted lever, inlet and outlet openings in said lower chambered casing portion, said inlet opening adapted to receive and hold a removable inlet connection and valve seat, a guiding portion in said removable inlet connection adapted to hold a sliding valve body having a valve disk at its end adjacent to and adapted to close said valve seat, a conical portion on said valve body opposite its seat end, adapted to abut said pivoted lever on the end opposite its abutting connection with the diaphragm, means acting through said pivoted lever to normally hold said valve disk closed against the valve seat, adjustable means in said upper casing portion adapted to normally force said diaphragm downward and open said valve seat for the passage of fluid whereby a regulated fluid pressure will be maintained in said lower chambered casing portion and the outlet connection therefrom.

2. In a pressure regulating valve, the combination of an upper casing portion and a lower chambered casing portion, a diaphragm imperviously separating said casing portions, inlet and outlet openings in said lower chambered casing portion, said inlet opening adapted to receive, and imperviously retain an outwardly removable inlet connection providing an integral valve seat, a cylindrical slideway for a sliding polygonal sided valve adapted to imperviously close said valve seat, said sliding valve comprising a seat disk at each end adapted to effectually close said valve seat against the flow of fluids, means within said lower chambered casing portion abutting said valve and said diaphragm for causing said valve to open and close through the combined action of the fluid pressure within said lower chambered casing portion and the outlet connection therefrom, and the adjustable means in said upper casing portion acting on said diaphragm.

3. In a pressure regulating valve, the combination of an upper casing portion and a lower chambered casing portion, a diaphragm imperviously separating said casing portions, inlet and outlet openings in said lower chambered casing portion, an outwardly removable inlet connection providing an integral valve seat and a cylindrical slideway for a polygonal sided valve adapted to imperviously close against said seat, an intermediate lever abutting said sliding valve and said diaphragm, means for closing said valve against said seat, said intermediate lever providing an intercepting means between the inlet fluid flow and said diaphragm for purpose of preventing erosive action of the fluid on said diaphragm, adjustable means for loading said diaphragm on its side opposite to said lever whereby a diminution of the reduced pressure will cause said diaphragm to move said lever to permit an opening of the valve seat and renew the flow of fluid for restoring the reduced, or regulated pressure.

ARTHUR W. CASH.
ELMER F. LEMMON.

Witnesses:
  GEORGE G. GLORE,
  G. L. MOORE.